United States Patent [19]
Nauth et al.

[11] Patent Number: 6,113,954
[45] Date of Patent: Sep. 5, 2000

[54] STABILIZATION OF MAYONNAISE SPREADS USING WHEY FROM NISIN-PRODUCING CULTURES

[75] Inventors: K. Rajinder Nauth, Wheeling; Mary Lynum, Schaumburg, both of Ill.

[73] Assignee: Kraft Foods, Inc., Northfield, Ill.

[21] Appl. No.: 09/386,680

[22] Filed: Aug. 31, 1999

Related U.S. Application Data

[60] Provisional application No. 60/098,516, Aug. 31, 1998.

[51] Int. Cl.$^7$ ................................ A23C 9/12; A23L 1/24
[52] U.S. Cl. ............................ 426/41; 426/34; 426/583; 426/602; 426/605
[58] Field of Search .................................. 426/34, 41, 36, 426/601, 605, 654, 614, 580, 583, 602, 613

[56] References Cited

U.S. PATENT DOCUMENTS

| | | | |
|---|---|---|---|
| 4,584,199 | 4/1986 | Taylor | 426/36 |
| 4,597,972 | 7/1986 | Taylor | 426/36 |
| 4,740,593 | 4/1988 | Gonzalez et al. | 435/243 |
| 4,798,729 | 1/1989 | Anders et al. | 426/326 |
| 4,888,191 | 12/1989 | Anders et al. | 426/281 |
| 5,015,487 | 5/1991 | Collison et al. | 426/332 |
| 5,017,391 | 5/1991 | Anders et al. | 426/129 |
| 5,186,962 | 2/1993 | Hutkins et al. | 426/61 |
| 5,338,682 | 8/1994 | Sasaki et al. | 435/253.4 |
| 5,451,369 | 9/1995 | Daeschel et al. | 422/28 |
| 5,458,876 | 10/1995 | Monticello | 424/94.61 |
| 5,527,505 | 6/1996 | Yamauchi et al. | 426/42 |
| 5,895,680 | 4/1999 | Cirigliano et al. | 426/326 |

OTHER PUBLICATIONS

Chung et al., "Effects of Nisin on Growth of Bacteria Attached to Meat", *Applied and Environmental Microbiology*, Jun. 1989, vol. 55, No. 6. p. 1329–1333.

Maas et al. "Sodium Lactage Delays Toxin Production by Clostridium botulinum in Cook–in–Bag Turkey Products", *Applied and Environmental Microbiology*, Sep. 1989, vol. 55, No. 9, p. 2226–2229.

*Primary Examiner*—Leslie Wong
*Attorney, Agent, or Firm*—Fitch, Even, Tabin & Flannery

[57] ABSTRACT

The present invention provides a stabilized mayonnaise spread that includes nisin-containing whey. According to the invention, the growth of a contaminating microorganism in the mayonnaise composition is inhibited. The invention additionally provides a method of making a stabilized mayonnaise spread, and a method of inhibiting the growth of a contaminating microorganism in a mayonnaise spread, which methods include the step of adding nisin-containing whey to the mayonnaise.

16 Claims, 1 Drawing Sheet

STABILIZATION OF MAYONNAISE SPREADS USING WHEY FROM NISIN-PRODUCING CULTURES this application is based upon Provisional application U.S. Ser. No. 60/098,516, filed Aug. 31, 1998.

FIELD OF THE INVENTION

The present invention relates to a mayonnaise spread that is stabilized against the growth of contaminating microorganisms. Stabilizing mayonnaise spreads against spoilage induced by microorganisms is especially important in light mayonnaise spreads and fat-free mayonnaise spreads.

BACKGROUND OF THE INVENTION

Mayonnaise spreads, known for about 200 years, commonly are formulated with a high content of fat or oil, and a correspondingly low content of moisture. Ingredients commonly used to constitute mayonnaise include edible vegetable oil, vinegar, lemon juice and/or lime juice, egg yolk and any of various flavorings, seasonings or spices. In view of these ingredients, it is seen that mayonnaise spreads typically are acidic; the aqueous component of the spread accordingly contains the acid and has a low pH. Mayonnaise spreads such as these are subject to spoilage; nevertheless, because of the low water content and the acidic pH, the extent and nature of contamination tend to be moderate. In particular, any contaminating microorganism must be able to tolerate the low pH and acid content of the mayonnaise spread. For this reason, common contaminants include certain members of the genus Lactobacillus, various members of the genus Bacillus, as well as certain yeasts, such as various members of the genus Saccharomyces (Smittle, J. Food Protection 40:415–422 (1977)). Lactobacilli are classified as homofermentative and heterofermentative. Lactobacilli that produce only acid when grown on any substrate are homofermentative. Heterofermentative lactobacilli produce both acid and a gas. These contaminants, upon proliferation, may lead to spoilage of the mayonnaise, and consequently to the loss of the spread and any food to which it has been added.

An interest of the public in recent years has been directed to consumption of foods containing lower quantities of fats and oils. This has led to the development of mayonnaise spreads with lower contents of these components. Whereas in conventional mayonnaise spreads the fat content may be about 50% or greater, low fat containing mayonnaise spreads may contain about 30% fat, or less, and spreads that are considered to be essentially fat-free may contain about 3% fat or less. The volume content lost when the fat is eliminated is generally compensated by including higher contents of the aqueous phase. In order to maintain the consistency associated with a mayonnaise spread, the aqueous phase is usually supplemented with a component to preserve the viscous, spoonable character of the spread, such as starch or a similar polysaccharide.

The increased content of moisture in low-fat and fat-free mayonnaises has certain consequences that must be addressed, however. First, a higher content of water renders the mayonnaise spread more susceptible to microbiological growth. Second, preserving the acid content of the aqueous phase similar to that present in conventional mayonnaise compositions, especially the incorporation of vinegar and citrus juices, results in a spread with a tartness that the consuming public tends to find objectionable. Efforts to reduce the tartness by diminishing the acid content, however, raises the pH and makes the low-fat spread more susceptible to microbiological contamination.

In one approach to this problem, food products containing acids, including mayonnaises and salad dressings, are formulated with fumaric acid, or with fumaric acid in combination with a food acidulent (U.S. Pat. No. 4,756,919). It is stated that microbiological spoilage attributable to lactic acid bacteria, in particular lactobacilli, is prevented with or without the use of chemical preservatives and/or the need for lengthy thermal processing times.

A similar approach to reducing tartness in salad dressings is disclosed as substituting acetic acid by any of various other organic acids, or phosphoric acid, in whole or in part (U.S. Pat. No. 4,927,657). According to this invention, tartness is reduced, in part, by providing buffers which increase the pH of the dressing product and confer enhanced mildness.

Alternatively, EP 0 689 773 discloses preserving the pH in mayonnaise spreads and dressing products as low as 3.5 or less, or preferably 3.3 or less, by using glucono-delta-lactone to retard microbial spoilage, alone or in combination with acetic acid. This formulation, it is disclosed, retains desirable organoleptic properties and minimal objectionable acidic bite. Additionally, antimycotics such as sodium sorbate, potassium sorbate, and benzoates are used as preservatives.

Nisin has also been used to help stabilize various food products. Nisin is a peptide-like antibacterial substance produced by microorganisms such as *Lactococcus lactis* subsp. *lactis* (formerly known as *Streptococcus lactis*). Its structure is illustrated in U.S. Pat. No. 5,527,505 to Yamauchi et al. The highest activity preparations of nisin contain about 40 million IU per gram. A commercial preparation, NISAPLIN™, containing about 1 million IU per gram is available from Aplin & Barrett Ltd., Trowbridge, England. Nisin has no known toxic effects in humans. It is widely used in a variety of prepared dairy foods. Experimental use in preserving other foods has also been reported. Details on these applications are provided below.

A number of efforts have been reported since 1975 directed to reducing uncoupled acid production in dairy fermentations by controlling the post-fermentation acidification of yogurt. In some of these studies, a nisin producing culture was introduced in an attempt to inhibit these effects. Kalra et al. (Indian Journal of Dairy Science 28: 71–72 (1975)) incorporated the nisin producing culture *Streptococcus lactis* (now known as *L. lactis* subsp. *lactis*) along with the yogurt culture before fermentation. Others introduced nisin in milk prior to fermentation (Bayoumi, Chem. mikrobiol. technol. lebensm. 13:65–69 (1991)) or following fermentation (Gupta et al., Cultured Dairy Products Journal 23: 17–18 (1988); Gupta et al., Cultured Dairy Products Journal 23: 9–10 (1989)). In all cases, the rate of post-fermentation acidification was only partially inhibited by these treatments and the yogurt continued to become more acidic throughout its shelf life.

In U.S. Pat. No. 5,527,505, by Yamauchi et al., yogurt was produced from raw milk by incorporating a nisin-producing strain, *Lactococcus lactis* subsp. *lactis*, along with the traditional yogurt culture consisting of *Streptococcus salivarius* subsp. *thermophilus* (ST) and *Lactobacillus delbrueckii* subsp. *bulgaricus* (LB). Yamauchi et al. teach that the lactococci are needed to secrete the nisin, whose effect is to retard the activity of ST and LB. The resulting yogurt therefore contains the lactococci used to produce the nisin. Nonetheless, the acidity of yogurt containing the nisin-producing bacteria increased by 64% to 96% in 14 days, in various experiments inoculated with differing amounts of *L. lactis* subsp. *lactis*, compared to the initial acidity at the completion of fermentation. Other studies (Hogarty et al., J. Food Protection 45:1208–1211 (1982); Sadovski et al., XX International Dairy Congress, Vol. E: 542-5-44 (1978)) also noted acid production and development of bitterness at low temperature by some mesophilic starter lactococci in dairy products.

Chung et al. (Appl. Envir. Microbiol. 55, 1329–1333 (1989)) report that nisin has an inhibitory effect on gram-positive bacteria, such as *L. monocytogenes, Staphylococcus aureus* and *Streptococcus lactis*, but has no such effect on gram-negative bacteria such as *Serratia marcescens, Salmonella typhimurium* and *Pseudomonas aeruginosa* when these microorganisms are attached to meat.

In U.S. Pat. No. 5,015,487 to Collison et al., the use of nisin, as a representative of the class of lanthionine bacteriocins, to control undesirable microorganisms in heat processed meats is disclosed. In tests involving dipping frankfurters in nisin solutions, the growth of *L. monocytogenes* was effectively inhibited upon storage at 4° C.

Nisin has been added to cheeses to inhibit toxin production by *Clostridium botulinum* (U.S. Pat. No. 4,584,199 to Taylor). U.S. Pat. No. 4,597,972 to Taylor discloses a detailed example in which chicken frankfurter components are shown to require the presence of both added nitrite and added nisin in order to prevent or delay botulinum toxin production when challenged with *C. botulinum*.

Nisaplin™ has been found to preserve salad dressings from microbiological contamination, such as challenge by *Lactobacillus brevis* subsp. *lindneri*, for an extended shelf life period (Muriana et al., J. Food Protection 58:1109–1113 (1995)).

Maas et al. (Appl. Envir. Microbiol. 55, 2226–2229 (1989)) report that lactate, when incorporated into a turkey meat vacuum-packed composition, delays the generation of botulinum toxin in a manner directly dependent on the concentration of lactate introduced into the composition. Maas et al. do not mention nisin.

In U.S. Pat. Nos. 4,888,191 and 5,017,391, Anders et al. disclose compositions and methods related to the use of lactate salts to delay *C. botulinum* growth in a foodstuff such as fish or poultry. The foods are heated to a temperature sufficient to cook the meat but not to sterilize the product. Anders et al. suggest that lactate may be used alone, or in combination with other agents such as sodium nitrite. These patents fail to discuss nisin or its properties.

There remains a need to prepare low-fat mayonnaise spreads and essentially fat-free mayonnaise spreads that resist spoilage brought about by microbiological contaminants. There additionally remains a need to respond to the preference of the consuming public for such mayonnaise spreads that are not excessively tart due to low pH values. As a corollary, such high moisture mayonnaise spreads having low acid contents must remain resistant to growth by microorganisms that may contaminate them from the environment. This invention addresses these needs.

SUMMARY OF THE INVENTION

The present invention provides a stabilized mayonnaise spread that includes a mayonnaise composition stabilized with a nisin-containing whey. In significant embodiments the fat content is about 33% or less (in a low-fat mayonnaise), or about 3% or less (in a fat-free mayonnaise). In a further important embodiment, the nisin-containing whey is prepared by a process including (i) inoculating a pasteurized dairy composition with a culture of a nisin-producing microorganism; (ii) incubating the composition until the pH attains a value between about 6.2 and about 4.0 and a whey and curd mixture is formed; and (iii) separating the whey from the whey and curd mixture. The separated whey obtained is the nisin-containing whey of the invention. In an alternative embodiment, the nisin-containing whey is obtained from the fermentation of a fortified cheese whey composition using nisin-producing microorganisms. According to the invention, the growth of a contaminating microorganism, such as a homofermenting lactobacillus, a heterofermenting lactobacillus, a yeast, or any two or more such microorganisms in the mayonnaise composition is inhibited. In an important embodiment, the proportion of nisin-containing whey in the mayonnaise is from about 0.5% to about 40% by weight. In advantageous embodiments, the stabilized mayonnaise has a pH of about 3.70 or higher, or a pH of about 4.00 or higher.

The invention additionally provides a method of making a stabilized mayonnaise spread, and a method of inhibiting the growth of a contaminating microorganism in a mayonnaise spread, which methods include the step of adding nisin-containing whey to the mayonnaise. In important embodiments of the methods the fat content of the mayonnaise is about 33% or less (in a low-fat mayonnaise), or about 3% or less (in a fat-free mayonnaise). The growth of a contaminating microorganism, such as a homofermenting lactobacillus, a heterofermenting lactobacillus, a yeast, or any two or more such microorganisms, in the mayonnaise is inhibited in the mayonnaise spreads resulting from these methods. In these methods, the proportion of nisin-containing whey included in the mayonnaise compositions is from about 0.5% to about 40% by weight. In advantageous embodiments of these methods, the stabilized mayonnaise has a pH of about 3.70 or higher, or a pH of about 4.00 or higher.

DETAILED DESCRIPTION OF THE INVENTION

Figure 1:
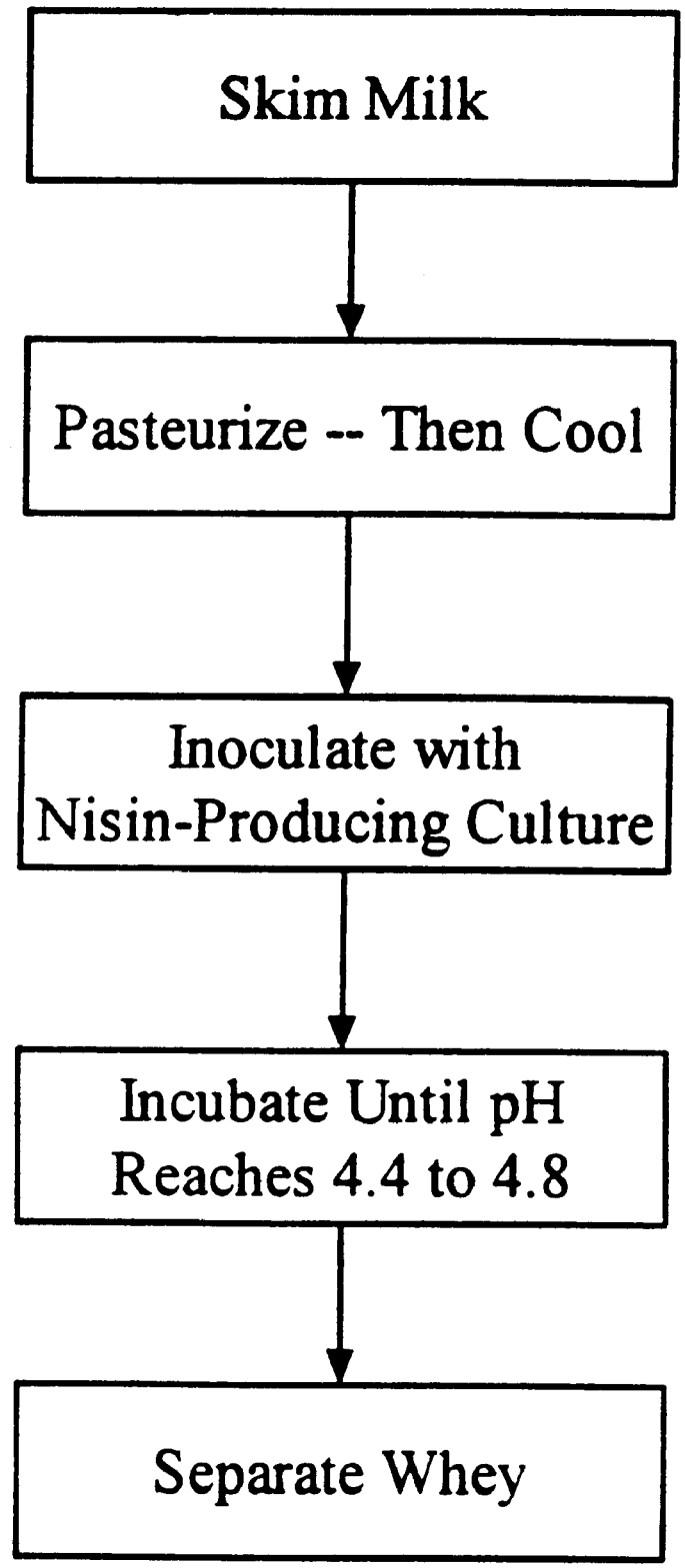
FIG. 1 provides a flow chart of steps used in the production of nisin-containing whey.

The present invention relates to stabilizing a mayonnaise spread or a salad dressing against the growth of contaminating microorganisms by the use of nisin-containing whey in place of water, and to methods of preserving mayonnaise spreads and of inhibiting the growth of contaminating microorganisms in mayonnaise spreads. The stabilization is directed in particular to low-fat and essentially fat-free mayonnaise spreads. As used herein, a low-fat mayonnaise spread contains about 30% to about 40% fat or oil, or less, for example; a low-fat spread may contain about 33% fat or oil, or less; and a fat-free mayonnaise spread contains about 4%, or about 3%, or less, of fat or oil.

The preparation and methods have as their central feature the use of nisin-containing whey as the component responsible for the stabilizing activity in the mayonnaise spreads. The preservative and stabilizing effects of nisin-containing whey find application in the preparation of other food products in addition to spreads of the instant invention. These include stabilized yogurt products, cooked meat products, and cream cheese products. Disclosures of these inventions, which are related to the instant application, appear in the applications entitled "Stabilization of Fermented Dairy Compositions Using Whey from Nisin-Producing Cultures", U.S. Ser. No. 60/098,518, filed Aug. 31, 1998, "Stabilization of Cooked Meat Compositions Using Whey from Nisin-Producing Cultures", U.S. Ser. No.60/098,465 filed Aug. 31, 1998, and "Stabilization of Cream Cheese Compositions Using Nisin-Producing Cultures", U.S. Ser. No. 60/098,472, filed Aug. 31, 1998, respectively, and are incorporated hereby in their entireties by reference.

For purposes of this invention, the term "nisin-containing whey" is intended to include the whey product, separated from the curd, derived from a nisin-producing culture. Generally, such a nisin-containing whey is obtained by any of a variety of equivalent procedures involving the fermentation of a nisin-producing microorganism. In one such procedure, a pasteurized dairy product such as milk or whey is first inoculated with the nisin-producing microorganism. After the dairy product curdles, the nisin-containing whey is separated from the curds of the curdled culture. The curds and whey can be separated by any conventional technique, including, for example, centrifugation, filtration, and the like. This method effectively removes most or essentially all of the microorganisms in the nisin-containing whey. In an alternative procedure, the nisin-containing whey is obtained from the fermentation of a fortified cheese whey composition using nisin-producing microorganisms. In this procedure, after the pH in the fermentation has fallen to about 5.5, the pH is then maintained at this value for 8–10 hrs before allowing the pH to drop further. The nisin-containing whey, separated from the corresponding curds, is then employed in the products and methods of this invention.

It is shown in the copending application entitled "Stabilization of Fermented Dairy Compositions Using Whey from Nisin-Producing Cultures", U.S. Ser. No. 60/098,518, filed Aug. 31, 1998, that nisin-containing whey has effects on nonpathogenic microorganisms beyond those obtained by addition of a purified preparation of nisin. Furthermore, it is shown in Example 2 that nisin-containing whey contains, or preserves, a significant concentration of lactate characteristic of whey. Thus nisin-containing whey may in general be understood to contain both nisin and lactate.

The fermenting cultures capable of producing nisin-containing whey have the potential of secreting many fermentation products into the medium, namely, into the whey of the culture. Thus, in addition to nisin and lactate, there may be further components present in nisin-containing whey produced by the fermentations yielding this whey. Among such components may be certain substances which contribute to the beneficial properties of the preservable preparations of the invention, and to the beneficial effects of the methods of the invention. Without wishing to limit the scope of this invention, therefore, the term "nisin-containing whey" encompasses all components contained therein, both those currently known and those which may remain uncharacterized at the present time, that contribute to the beneficial attributes of the present invention.

As used herein, "nisin-containing whey" also relates to the whey described above that has subsequently been reduced in volume to a more concentrated liquid, or that has been completely dried, by evaporation, lyophilization or a comparable procedure. The term relates additionally to such a concentrated or dried whey that is subsequently reconstituted, either partially or completely, by the addition of water or a water-containing composition.

The nisin-containing whey used in this invention may be obtained using a procedure that includes the following steps: (i) pasteurizing a dairy liquid such as milk, whether whole milk, partially defatted milk or skim milk, (ii) cooling and inoculating the liquid with a culture of a nisin-producing microorganism, (iii) incubating until the pH has fallen to a range of 4.4 to 4.8 as a result of the fermentation, whereupon a suspension of curds in liquid whey is formed, and (iv) separating the curds from the whey, for example by centrifugation or filtration (see FIG. 1). Alternatively, nisin-containing whey may be prepared by the sequential steps (i) preparing an aqueous composition comprising sweet whey from the fermentation of a cheese, whey protein concentrate, and a protein hydrolysate; (ii) fermenting the aqueous composition with a nisin-producing culture until the pH attains about 5.5; (iii) maintaining the pH of the fermenting composition at about 5.5 for 8–10 hrs; and (iv) allowing the pH of the fermenting composition to drop to 4.8 or lower. An example of a nisin-producing microorganism is *Lactococcus lactis* subsp. *lactis*. The resulting whey is the nisin-containing whey of the invention.

As used herein, the term "stabilized preparation" as applied to mayonnaise spreads relates to a preparation which has been treated so that the growth of contaminating microorganisms is inhibited or is retarded. Examples of microorganisms that may contaminate mayonnaise spreads include, but are not limited to, members of the genus Lactobacillus, various members of the genus Bacillus, as well as certain yeasts, such various members of the genus Saccharomyces. According to the present invention, the growth of such contaminants is prevented or inhibited by nisin-containing whey.

As shown in the copending application entitled "Stabilization of Fermented Dairy Compositions Using Whey from Nisin-Producing Cultures", U.S. Ser. No. 60/098,518, filed Aug. 31, 1998, nisin-containing whey has beneficial effects when incorporated into fermented dairy products such as yogurts, buttermilks, and sour creams. Yogurt is generally made by fermenting milk with a culture that contains thermophilic organisms such as *Streptococcus salivarius* subsp. *thermophilus* (ST) and *Lactobacillus delbrueckii* subsp. *bulgaricus* (LB). Additional cultures such as *Lactobacillus acidophilus* and bifidobacteria may also be included. Conventional fermented dairy products such as these continue to form acidic products, and in some cases, to develop bitterness, upon storage over times routinely involved in shipping them, selling and domestic storage. The addition of nisin-containing whey to such fermentations inhibits these undesired effects, conferring beneficial stability and taste to the products. These effects may not be ascribable to the presence of lactate in the nisin-containing whey, however, because all lactic fermentations by their nature produce lactic acid and yet are not stable to storage.

These effects on dairy cultures furthermore cannot be achieved by the addition of purified nisin to the cultures. Introducing purified nisin in milk prior to fermentation (Bayoumi, Chem. mikrobiol. technol. lebensm. 13:65–69 (1991)) or following fermentation (Gupta et al., Cultured Dairy Products Journal 23: 17–18 (1988); Gupta et al., Cultured Dairy Products Journal 23: 9–10 (1989)) only partially inhibited the rate of post-fermentation acidification, and the yogurt continued to become more acidic throughout its shelf life. Thus nisin alone is not capable of preventing continued acidification; as shown in the Examples, nisin-containing whey is required to achieve these results. It may be inferred that nisin-containing whey may also contain additional components currently not identified that contribute to the attainment of these beneficial effects. As noted above, the lactate found in nisin-containing whey does not appear to be responsible for these properties.

The present inventors have directed their attention to the problems identified above under "Background of the Invention", namely, the preparation of low-fat mayonnaise spreads and essentially fat-free mayonnaise spreads that resist microbiological contamination. These spreads should not be excessively tart, yet should maintain resistance to growth of microorganisms.

The inventors examined a low-fat mayonnaise and an essentially fat-free mayonnaise available in the market for resistance to microbiological contamination, and discovered that those products in fact became contaminated upon challenge, and thereby were spoiled. They then proceeded to develop formulations intended to retard or prevent the growth of contaminating microorganisms in low-fat and fat-free preparations based on the use of nisin-containing whey in place of some or all of the water used therein. As indicated above, it was necessary to balance keeping the product from being excessively tart, or acid, with not being so devoid of acidity that growth of contaminants was encouraged. Thus, alternative contributors to acidity, other than acetic acid or citrus juices, were incorporated, such as phosphoric acid. During the course of the project leading to the products and methods of the invention, it was found that the mayonnaise spreads developed an objectionable bitterness. It required further development to overcome this unforeseen problem and to provide products, and methods yielding them, with acceptable flavor and organoleptic properties, that had appropriate levels of acidity and pH values, and that were preserved against challenge by the commonly known microbiological contaminants that may cause spoilage of mayonnaise products.

The low-fat and fat-free mayonnaise spreads are prepared by blending a premix and a starch base in a homogenizing mixer. The premix includes nisin-containing whey and the oil or fat component. The starch base, which conventionally is prepared with water, is prepared in the inventive formulation by starch suspended in mixtures of nisin-containing whey and water whose proportions are adjusted such that the content of the whey in the final mayonnaise spread is at a desired level. In important embodiments of the invention, the proportion of nisin-containing whey in the final spread may range from about 20% or lower to about 45% or higher.

The premix is formulated to contain nisin-containing whey, fat or oil, emulsifiers that contain whole eggs, or preparations containing egg yolk, or preparations containing alternative emulsifiers, vegetable gums, ethylenediaminetetraacetic acid (EDTA), flavorings and spices, and sugar. The starch base includes a starch, a mixture of nisin-containing whey and water, and acids including vinegar, lactic acid, and phosphoric acid. The premix and the starch base are combined in proportions of about 50 to about 80% premix and about 20 to about 50% starch base, preferably about 50 to about 70% premix and about 30 to about 50% starch base, and most preferably about 54% premix and about 46% starch base.

Except for the nisin-containing whey, the mayonnaise products of this invention are generally prepared using conventional ingredients and processes. Examples of fats or oils that are suitable for use in the low-fat and essentially fat-free mayonnaise spreads of the invention include soybean oil and similar oils. Suitable emulsifiers include whole eggs, preparations of egg yolk that contain, for example, egg lecithin, or other conventional food-grade emulsifiers. Vegetable gums that may be used include, for example, xanthan gum, guar gum, carob gum, locust bean gum, gum tragacanth, and gum arabic. Starches that are suitable for use in the spreads of this invention include, for example, common corn starch, waxy maize, high-amylose potato starch, tapioca, and the like. Preferred starches are National Starch #377 and Staley's Mira Thick 603. Suitable flavorings include salt, paprika flavor, black pepper, mustard, onion, garlic, and the like. The starch base is formulated and heated to about 190° F. for cooking, then cooled to about 90° F. to about 110° F. The premix is blended and emulsified, and then combined with the cooled starch base. The combined mixture is blended to homogeneity to create the finished product.

EXAMPLES

General Methods

Aerobic plate count was performed using the procedure outlined in Bacteriological Analytical Manual (Food and Drug Administration, BAM), 8th Edition, 1995, Chapter 3. The plating medium used was brain heart infusion (BHI) agar. *Streptococcus salivarius* subsp. *thermophilus* (ST) was enumerated on M17 agar (Atlas, R. M., 1993, Handbook of Microbiological Media, CRC Press, Inc. Pages 148, 532, 621). *Lactobacillus bulgaricus* (LB) was enumerated on MRS agar (Atlas, ibid.). The plates for ST and LB were incubated anaerobically at 40° C. for two days. The nisin producing lactococci were enumerated on BHI agar, incubated anaerobically at 30° C. for two days.

Nisin activity in the fermented milk was determined by the method of Fowler et al. (Techn. Series Soc. Bacteriol. 8:91–105 (1975)). The strain *L. lactis* subsp. *cremoris* that is sensitive to nisin was used as an indicator. Nisaplin™, a standardized preparation of nisin ($10^6$ units/g) from Aplin and Barrett, was used as the standard to determine nisin activity in various preparations. Each assay plate had nisin standards.

PRODUCTION OF NISIN-CONTAINING WHEY AND USE IN DAIRY PRODUCTS

Example 1

This example illustrates the production of nisin-containing whey from a nisin-producing culture. The significant steps involved are shown schematically in FIG. 1. A nisin-producing culture was inoculated at $5 \times 10^6$ cfu/ml in pasteurized skim milk cooled to 30° C. The mixture was allowed to incubate for about 16 hours and was then cooled to 5–7° C. The fermented milk had about $8.0 \times 10^8$ cfu/ml of the cultured bacteria, a pH of about 4.4 to 4.6, and a titratable acidity of 0.75%. It contained nisin equivalent activity of about 1300 international units/ml as determined by well assay using a nisin-sensitive strain of *Lactococcus lactis* subsp. *cremoris*. The cultured milk was centrifuged to separate the whey from the curd and the nisin-containing whey removed. A detailed comparison between the fermented milk and the resulting whey is given in Table 1. The whey contained more than about 100-fold fewer cfu/ml of the nisin-producing microorganisms compared to the fermented milk culture while still preserving the full nisin activity of the fermented milk. The curd retained more than 99% of the lactococcus counts determined for whey and curd together.

TABLE 1

Characteristics of Centrifuged Nisin-Containing Whey Obtained from Lactococcus-Fermented Skim Milk

|  | Fermented Milk | Whey | Curd |
|---|---|---|---|
| pH | 4.43 | 4.45 | 4.5 |
| Titratable acidity | 0.75% | 0.54% | — |
| Culture count | $8.0 \times 10^8$ cfu/ml | $6.6 \times 10^6$ cfu/ml | $3.9 \times 10^9$ cfu/g |
| Nisin equivalent activity | 1300 IU/ml | 1300 IU/ml | 600 IU/g |

Example 2

This example also illustrates the preparation and properties of a nisin-containing whey derived from a nisin-producing culture. Milk was fermented with approximately $5 \times 10^6$ cfu/g nisin-producing lactococci until the culture attained a pH of 4.43. The fermented milk was then centrifuged at 10,000 rpm for 15 minutes and the supernatant (i.e., whey) was recovered. The whey had a pH of 4.45 and a nisin activity of about 1300 IU/ml (essentially the same values as in the fermented milk prior to centrifugation). The whey had a culture population of $6.6 \times 10^6$ cfu/ml (as compared to $8.0 \times 10^8$ cfu/ml in the original fermented milk; see Table 1). The whey recovered from a dairy fermentation of nisin-producing microorganisms has a titer of nisin-producing lactococci that is less than about 1% of that of the fermentation prior to separation of the whey.

In a second run, a skim milk/whey mixture was fermented at pH 5.5 for about 8–10 hours and then allowed to acidify further to a pH of about 4.6. The resulting nisin-containing whey from a pH controlled propagation had a pH of about 4.65, a lactate concentration of about 13.05 g/L, and a nisin activity of about 2,100 U/g.

Example 3

This example provides an alternative fermentation for nisin-containing whey yielding a high level of nisin equivalent activity. Sweet whey from fermentations of cheeses such as Swiss cheese, Parmesan cheese, mozzarella cheese, or cheddar cheese is fortified with whey protein concentrate (WPC) and a protein hydrolysate which may be, for example N-Z amine™ or soy protein hydrolysate. The components are blended with water as shown:

| Cheese whey (Krafen ™) | 3.8% (total solids basis) |
|---|---|
| WPC | 2.9% |
| Protein hydrolysate | 0.1% |
| Water | 93.2% |

The blended formulation (pH~6.1–6.25) is autoclaved, cooled, and inoculated with a nisin-producing culture at 0.1–1.0%. The fermentation is allowed to proceed to pH 5.5 with stirring, which requires about 7–8 hrs. The pH is then maintained at pH 5.5 for 8–10 hrs by the addition concentrated NaOH by means of a pH controller. The pH regulation is then stopped and the pH allowed to drop to pH 4.8 or lower, at about 22 hrs of total fermentation time. This resulting preparation has a nisin activity of about 2100–2800 IU/g. If necessary it may be centrifuged in order to use the supernatant only, or the whole fermented whey may be used directly.

MAYONNAISE SPREADS

Example 4

Formulations for Low-fat Mayonnaise Spreads.

Starch bases providing differing levels of nisin-containing whey in the final mayonnaise spreads are presented in this Example.

TABLE 2

Starch base for 40% whey in the final spread.

| Component | Amount (grams) |
|---|---|
| Nisin-containing whey | 438.12 |
| Water | 273.49 |
| Potassium sorbate | 3.04 |
| Thermotex ™ starch | 84.35 |
| 80% $H_3PO_4$ | 1.00 |

TABLE 3

Starch base for 35% whey in the final spread.

| Component | Amount (grams) |
|---|---|
| Nisin-containing whey | 368.12 |
| Water | 343.49 |
| Potassium sorbate | 3.04 |
| Thermotex starch | 84.35 |
| 80% $H_3PO_4$ | 1.00 |

TABLE 4

Starch base for 30% whey in the final spread.

| Component | Amount (grams) |
|---|---|
| Nisin-containing whey | 298.12 |
| Water | 413.49 |
| Potassium sorbate | 3.04 |
| Thermotex starch | 84.35 |
| 80% $U_3PO_4$ | 1.00 |

TABLE 5

Starch base for 25% whey in the final spread.

| Component | Amount (grams) |
|---|---|
| Nisin-containing whey | 228.12 |
| Water | 483.49 |
| Potassium sorbate | 3.04 |
| Thermotex starch | 84.35 |
| 80% $H_3PO_4$ | 1.00 |

The premix used in all cases is given in Table 6.

TABLE 6

Premix formulation

|  | Amount (grams) |
|---|---|
| Dry components: |  |
| Xanthan | 0.44 |
| Salt | 10.00 |

TABLE 6-continued

Premix formulation

| | Amount (grams) |
|---|---|
| EDTA | 0.16 |
| Dijon mustard | 0.83 |
| Oriental mustard | 0.83 |
| Onion powder | 0.10 |
| Garlic powder | 0.12 |
| Sugar | 66.67 |
| Liquid components: | |
| Nisin-containing whey | 121.88 |
| Soybean oil | 348.34 |
| Tert-butylhydroquinone (TBHQ) in oil | 7.33 |
| Black pepper (oleoresin) | 0.03 |
| Lemon juice concentrate | 1.11 |
| Salted egg yolk | 41.70 |
| Paprika paste | 0.37 |

The premix is combined with any one of the starch bases in the ratio 54 parts premix to 46 parts starch base.

Reference Example

Microbiological Stability of Competitive Mayonnaise Spreads.

Competitive mayonnaise spreads were challenged with microorganisms and growth was followed for 3 weeks. The homofermenting microorganisms were *Lactobacilllus plantarum* and *L. buchneri*; the heterofermenting microorganisms were *L. brevis* and *L. fermentum*; and the yeasts were *Hansenula anomala, Debaryomyces hansenii* (klochen), *Saccharomyces cerevisiae, Candida lusitaniae, C. krusei, C. lipolytica*, and *Zygosaccharomcyes bispora* (globiformis). The results are shown in Table 7.

TABLE 7

Challenge of competitive mayonnaise spreads with contaminant microorganisms.

| Sample | pH/Total Acidity | Micro-organism | Initial cfu/g | 1 week cfu/g | 3 weeks cfu/g |
|---|---|---|---|---|---|
| "Light" ~33% fat | 3.94/0.39% | Homoferm. | $7.9 \times 10^4$ | $2.2 \times 10^6$ | $3.6 \times 10^6$ |
| | | Heteroferm. | $1.0 \times 10^5$ | $3.1 \times 10^7$ | $1.0 \times 10^7$ |
| | | Yeast | $6.9 \times 10^4$ | $5.5 \times 10^4$ | $5.1 \times 10^3$ |
| "Low-fat" ~6% fat | 3.95/0.31% | Homoferm. | $5.8 \times 10^4$ | $1.6 \times 10^5$ | $5.5 \times 10^6$ |
| | | Heteroferm. | $9.2 \times 10^4$ | $4.7 \times 10^5$ | $7.7 \times 10^5$ |
| | | Yeast | $6.0 \times 10^4$ | $2.5 \times 10^4$ | $4.4 \times 10^3$ |

It is seen that the competitive spreads failed to inhibit challenge microorganisms within one week of challenge, regardless of the microorganism inoculated.

Example 5

Microbiological Challenge of Low-fat Mayonnaise Prepared with Nisin-Containing Whey.

Low-fat mayonnaise was prepared with various proportions of nisin-containing whey. The samples also contained a variety of additives in order to assess whether they were required to preserve stability against contamination. These additives were phosphoric acid (about 0.59%) to maintain acidity, tert-butylhydroquinone (TBHQ) (about 0.008%), and Tween 20 (about 0.08 to about 0.12%). The mayonnaise compositions were challenged with a homofermentative culture or a heterofermentative culture, and stability to the challenge was assessed after incubation at room temperature for 6 weeks. These samples were compared to a conventional low-fat mayonnaise, and mayonnaise compositions prepared using whey from a culture that does not produce nisin. The results are given in Table 8.

TABLE 8

Microbiological Challenge of Low-fat Mayonnaise Compositions.

| Nisin-containing whey, % | Phosphoric acid | TBHQ | Tween 20 | pH/Total Acid | Nissin, IU/g | Homo-ferm.* | Hetero-ferm.* |
|---|---|---|---|---|---|---|---|
| 52 | ● | ● | ● | 3.72/0.82 | 2100 | + | + |
| 52 | ● | ● | | 3.73/0.82 | 2100 | + | + |
| 52 | ● | | | 3.76/0.82 | 1800 | + | + |
| 36 | ● | ● | ● | 3.86/0.58 | 1800 | + | + |
| 36 | ● | ● | | 3.84/0.58 | 2000 | + | + |
| 36 | ● | | | 3.85/0.58 | 1900 | + | + |
| 20 | ● | ● | ● | 4.10/0.35 | 1200 | − | + |
| 20 | ● | ● | ● | 3.81/0.38 | 1300 | − | + |
| 20 | ● | ● | | 4.01/0.35 | 1200 | − | + |
| 20 | ● | | | 4.03/0.35 | 1300 | − | + |
| 11 | ● | ● | ● | 3.74/0.46 | 940 | + | + |
| 11 | ● | ● | | 3.73/0.45 | 940 | + | + |
| 11 | ● | | | 3.72/0.44 | 950 | + | + |
| 0** | | | | 3.60/0.34 | NT | − | + |
| 0*** | ● | ● | ● | 3.96/0.37 | NT | − | − |
| 0*** | ● | ● | | 3.98/0.37 | NT | − | − |
| 0*** | ● | | | 3.98/0.37 | Nt | − | − |

●, component present
*+, stable; −, contaminated.
**Conventional low-fat mayonnaise.
***52% whey from a culture that does not produce nisin.
NT, not tested.

The results in Table 8 show that all the inventive mayonnaise compositions are stable against heterofermentative challenge over 6 weeks. The mayonnaise compositions containing 20% nisin-containing whey, whose pH is slightly higher than the other compositions, are the only ones which show contamination by homofermentative challenge in this time period. The results appear to be independent of whether the mayonnaise contains TBHQ or Tween 20. A control mayonnaise that is prepared with whey from a fermentation that does not produce nisin becomes contaminated with both homofermentative and heterofermentative microorganisms. Furthermore, competitive mayonnaise compositions failed microbiological challenge, as shown in the Reference Example. Thus the inventive mayonnaise compositions prepared with nisin-containing whey provide protection against contamination that is unexpected in the art.

Example 6
Microbiological Challenge of Low-fat Mayonnaise Prepared with Nisin-Containing Whey at pH>4.

Low-fat mayonnaise spreads including the same components as set forth in Example 5 were prepared with nisin-containing whey (49.6%) replacing the water normally used. These spreads further contained 0.0066% TBHQ and 0.014% EDTA. They were tested against microbiological challenge by homofermentative Lactobacillus, heterofermentative Lactobacillus, and yeast as in the Reference Example for up to 12 weeks at room temperature. The pH values of the mayonnaise samples were above 4.1. The results are shown in Table 9.

TABLE 9

Microbiological Challenge of Low-fat Mayonnaise Compositions.

| pH/Total Acid (%) | Challenge Organism | Initial cfu/g | 2 wk cfu/g | 4 wk cfu/g | 6 wk cfu/g | 8 wk cfu/g | 12 wk cfu/g |
|---|---|---|---|---|---|---|---|
| 4.28/0.39 | Homofm. | $10^3$ | <10 | <10 | ~$10^6$ | $4.8 \times 10^6$ | |
| | Heterofm. | $2.8 \times 10^4$ | <10 | <10 | <10 | <10 | |
| | Yeast | $8.8 \times 10^3$ | 250 | <10 | <10 | <10 | |
| | Nisin | 1150 | | 540 | | | <100 |
| 4.18/0.57 | Homofm. | $10^3$ | <10 | <10 | <10 | <10 | <10 |
| | Heterofm. | $10^4$ | <10 | <10 | <10 | <10 | <10 |
| | Yeast | $10^4$ | <10 | <10 | <10 | <10 | <10 |
| | Nisin | 2000 | | 170 | | | <100 |

The results in Table 9 show that low-fat mayonnaise formulated with nisin-containing whey is stable to challenge by homofermentative Lactobacillus, heterofermentative Lactobacillus, and yeast for up to 12 weeks when the pH is less than 4.28. The sample at pH 4.28 was not stable. Another sample exhibited stability for 20 weeks (data not shown). Low-fat mayonnaise was negative for Lactobacillus growth when a 5 g sample (rather than the usual 0.1 g sample) of mayonnaise is assayed. As shown in Example 5, a control mayonnaise that was prepared with whey from a fermentation that does not produce nisin becomes contaminated with both homofermentative and heterofermentative microorganisms. Furthermore, competitive mayonnaise compositions failed microbiological challenge, as shown in the Reference Example. Thus low-fat mayonnaise prepared using nisin-containing whey at a pH of about 4.18 or less is stable to microbiological contamination, and provides protection against contamination that is unexpected in the art.

Example 7
Microbiological Challenge of Fat-Free Mayonnaise Prepared with Nisin-Containing Whey at pH Greater Than About 4.

A conventional fat-free mayonnaise composition normally contains about 60–62% water. In this Example, fat-free mayonnaise was prepared with nisin-containing whey replacing all or most of the water. The mayonnaise samples also contained about 0.0054% TBHQ, about 0.014% EDTA, and about 0.12% Tween 20. Samples of this mayonnaise at various pH values were tested against microbiological challenge by homofermentative Lactobacillus, heterofermentative Lactobacillus, and yeast for up to 12 weeks at room temperature. The pH values of the mayonnaise samples were above 3.9. The results are shown in Table 10. Sample I had a pH of 4.36, a total acidity of 0.28%, and contained 61.5% of nisin-containing whey. Sample 2 had a pH of 3.95, a total acidity of 0.75%, and contained 61.5% of nisin-containing whey. Sample 3 had a pH of 4.04, a total acidity of 0.52%, and contained 53.8% of nisin-containing whey.

TABLE 10

Microbiological Challenge of Fat-Free Mayonnaise Compositions.

| Sample | Challenge Organism | Initial cfu/g | 2 wk cfu/g | 4 wk cfu/g | 6 wk cfu/g | 8 wk cfu/g | 12 wk cfu/g |
|---|---|---|---|---|---|---|---|
| 1 | Homofm. | $3.3 \times 10^3$ | <10 | $10^5$ | $6.0 \times 10^6$ | | |
| | Heterofm. | $1.6 \times 10^4$ | <10 | <10 | <10 | | |
| | Yeast | $1.5 \times 10^4$ | | <10 | <10 | | |
| | Nisin | 1400 | | | 70 | | |
| 2 | Homofm. | $10^4$ | | <10 | <10 | <10 | <10 |
| | Heterofm. | $10^4$ | | <10 | <10 | <10 | <10 |
| | Yeast | $10^4$ | | <10 | <10 | <10 | <10 |
| | Nisin | 1900 | | | | | 1200 |
| 3 | Homofm. | $10^3$ | | <10 | <10 | <10 | <10 |
| | Heterofm. | $10^4$ | | <10 | <10 | <10 | <10 |
| | Yeast | $10^4$ | | <10 | <10 | <10 | <10 |
| | Nisin | 1300 | | | | | 300 |

The results in Table 10 show that fat-free mayonnaise formulated with nisin-containing whey at pH values below about 4.4 is stable to challenge by homofermentative Lactobacillus, heterofermentative Lactobacillus, and yeast for up to 12 weeks. Fat-free mayonnaise was negative for Lactobacillus growth using a 5 g sample (rather than the normal 0.1 g sample). As shown in Example 5, a control mayonnaise that was prepared with whey from a fermentation that does not produce nisin becomes contaminated with both homofermentative and heterofermentative microorganisms. Furthermore, competitive mayonnaise compositions failed microbiological challenge, as shown in the Reference Example. Thus fat-free mayonnaise prepared using nisin-containing whey at pH of below about 4.36, and at least to a pH of about 3.95, is stable to microbiological contamination, and provides protection against contamination that is unexpected in the art.

Example 8
Microbiological Challenge of Dairy Mayonnaise Prepared with Nisin-Containing Whey.

Dairy mayonnaise compositions containing about 48% fat, prepared with nisin-containing whey, and containing about 0.0094% TBHQ, about 0.423% EDTA, and about 0.1575% potassium sorbate were tested against microbiological challenge by homofermentative Lactobacillus, heterofermentative Lactobacillus, and yeast for up to 16 weeks at room temperature. The "boosted" sample in the following Table 11 represents a mayonnaise composition containing 20% nisin-containing whey and added cream (70% fat) to mimic conventional 2% milk. The "regular" sample contained 2% milk (20%) that had been cultured with a nisin-producing culture. The pH values of the both mayonnaise samples were adjusted to 4.07 (total acidity of 0.6–0.76%) by the addition of phosphoric acid. The results are shown in Table 11.

TABLE 11

Microbiological Challenge of Dairy Mayonnaise Compositions.

| Sample | Challenge Organism | Initial cfu/g | 2 wk cfu/g | 4 wk cfu/g | 6 wk cfu/g | 8 wk cfu/g | 12 wk cfu/g | 16 wk cfu/g |
|---|---|---|---|---|---|---|---|---|
| Boosted Sample | Homofm. | $2.3 \times 10^4$ | 110 | <10 | <10 | <10 | <10 | <10 |
| | Heterofm. | $2.1 \times 10^4$ | <10 | <10 | <10 | <10 | <10 | <10 |
| | Yeast | $1.8 \times 10^4$ | <10 | <10 | <10 | <10 | <10 | <10 |
| | Nisin | 1250 | 1200 | 1250 | 1250 | 770 | 790 | 760 |
| Regular Sample | Homofm. | $3.3 \times 10^3$ | $2.0 \times 10^3$ | $8.0 \times 10^3$ | 85 | <10 | 20 | <10 |
| | Heterofm. | $4.8 \times 10^3$ | <10 | <10 | <10 | <10 | <10 | <10 |
| | Yeast | $1.6 \times 10^4$ | 420 | <10 | <10 | <10 | <10 | <10 |
| | Nisin | 440 | 330 | 540 | 540 | 430 | 240 | 200 |

The results in Table 11 show that dairy mayonnaise containing about 48% fat and formulated with nisin-containing whey is stable to challenge by homofermentative Lactobacillus, heterofermentative Lactobacillus, and yeast for up to 16 weeks. As shown in Example 5, a control mayonnaise that was prepared with whey from a fermentation that does not produce nisin becomes contaminated with both homofermentative and heterofermentative microorganisms. Furthermore, a competitive low-fat mayonnaise composition containing ~33% fat failed microbiological challenge, as shown in the Reference Example. Thus, this example shows that dairy mayonnaise prepared using nisin-containing whey having a pH of about 4.1 is stable to microbiological contamination, and provides protection against contamination that is unexpected in the art.

We claim:

1. A method of making a stabilized mayonnaise spread, said method comprising the step of incorporating an effective amount a nisin-containing whey into a mayonnaise composition, thereby forming a stabilized mayonnaise spread which is resistant to the growth of potentially contaminating microorganisms, wherein the nisin-containing whey is prepared by a process comprising the steps of
   (i) inoculating a pasteurized dairy composition with a culture of a nisin-producing microorganism;
   (ii) incubating the composition until the pH attains a value between about 6.2 and about 4.0 and a whey and curd mixture is formed; and
   (iii) separating the whey from the when and curd mixture, wherein the separated whey is the nisin-containing whey.

2. The method of making the stabilized mayonnaise spread described in claim 1 wherein the fat content of the mayonnaise is about 33% or less.

3. The method of making the stabilized mayonnaise spread described in claim 1 wherein the fat content of the mayonnaise is about 3% or less.

4. The method of making the stabilized mayonnaise spread described in claim 1 wherein the potentially contaminating microorganism is a homofermenting lactobacillus, a heterofermenting lactobacillus, a yeast, or any two or more such microorganisms.

5. The method of making the stabilized mayonnaise spread described in claim 1 wherein the proportion of nisin-containing whey is from about 0.5% to about 40% by weight.

6. The method of making the stabilized mayonnaise spread described in claim 1 wherein the mayonnaise has a pH of about 3.70 or higher.

7. The method of making the stabilized mayonnaise spread described in claim 1 wherein the mayonnaise has a pH of about 4.00 or higher.

8. A method of inhibiting the growth of objectionable or pathogenic-contaminating microorganisms in a mayonnaise spread, comprising the step of incorporating a nisin-containing whey in the mayonnaise spread, wherein the proportion of nisin-containing whey is effective to inhibit the growth of objectionable or pathogenic/contaminating microorganisms, and wherein the nisin-containing whey is prepared by a process comprising the steps of
   (i) inoculating a pasteurized dairy composition with a culture of a nisin-producing microorganism;
   (ii) incubating the composition until the pH attains a value between about 6.2 and about 4.0 and a whey and curd mixture is formed; and
   (iii) separating the whey from the whey and curd mixture, wherein the separated whey is the nisin-containing whey.

9. The method described in claim 8 wherein the fat content of the mayonnaise spread is about 33% or less.

10. The method described in claim 9 wherein the fat content of the mayonnaise spread is about 3% or less.

11. The method described in claim 8 wherein the objectionable or pathogenic-contaminating microorganism is a homofermenting lactobacillus, a heterofermenting lactobacillus, a yeast, or any two or more such microorganisms.

12. The method described in claim 8 wherein the proportion of nisin-containing whey is from about 0.5% to about 40% by weight.

13. The method described in claim 8 wherein the mayonnaise spread has a pH of about 3.70 or higher.

14. The method described in claim 9 wherein the mayonnaise spread has a pH of about 4.00 or higher.

15. A method of making a stabilized mayonnaise spread, said method comprising the step of incorporating an effective amount a nisin-containing whey into a mayonnaise composition, thereby forming a stabilized mayonnaise spread which is resistant to the growth of potentially contaminating microorganisms, wherein the nisin-containing whey is prepared by a process comprising the sequential steps of (i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing whey.

16. A method of inhibiting the growth of objectionable or pathogenic-contaminating microorganisms in a mayonnaise spread, comprising the step of incorporating a nisin-containing whey in the mayonnaise spread, wherein the proportion of nisin-containing whey is effective to inhibit the growth of objectionable or pathogenic/contaminating microorganisms and wherein the nisin-containing whey is prepared by a process comprising the sequential steps of (i) preparing an aqueous composition comprising sweet whey from the fermentation of a cheese, whey protein concentrate, and a protein hydrolysate;

(ii) fermenting the aqueous composition with a nisin-producing culture until the pH attains about 5.5;

(iii) maintaining the pH of the fermenting composition at about 5.5 for 8–10 hrs; and (iv) allowing the pH of the fermenting composition to drop to 4.8 or lower, wherein the resulting composition comprises the nisin-containing whey.

* * * * *